June 30, 1970      E. W. GLATFELTER      3,517,574

TWO-SPEED DRIVE FOR POWER TOOL

Filed July 12, 1968      4 Sheets-Sheet 1

INVENTOR.
Edward W. Glatfelter

BY

Paul & Paul

ATTORNEYS.

June 30, 1970   E. W. GLATFELTER   3,517,574
TWO-SPEED DRIVE FOR POWER TOOL
Filed July 12, 1968   4 Sheets-Sheet 3

INVENTOR.
Edward W. Glatfelter
BY
Paul & Paul
ATTORNEYS.

United States Patent Office 3,517,574
Patented June 30, 1970

3,517,574
TWO-SPEED DRIVE FOR POWER TOOL
Edward William Glatfelter, 3514 Lewis Road,
Newtown Square, Pa. 19073
Filed July 12, 1968, Ser. No. 744,459
Int. Cl. F16d *3/34;* F16h *5/52*
U.S. Cl. 74—812                                    10 Claims

ABSTRACT OF THE DISCLOSURE

A two-speed drive for a power tool is disclosed in which the input shaft, driven by a constant speed reversible motor, is connected to the output shaft through one or the other of two gear trains designed to drive the output shaft in the same direction of rotation but at one or the other of two speeds. Each gear train includes a uni-directional clutch, but only one of the clutches is engaged at a time, the other being free running. Which clutch is engaged and which clutch is free-running depends solely upon the direction of rotation of the reversible drive motor.

FIELD OF THE INVENTION

This invention relates to a two-speed (or multispeed) drives for power operated tools, or other appliances, in which an output shaft is driven in the same direction at one of two (or more) speeds depending upon the coupling between a constant speed drive motor and the output shaft.

DESCRIPTION OF THE PRIOR ART

In one type of prior art device for providing two-speed operation of power tools from a single constant-speed source, it is necessary to stop the tool and shift the chuck from one position to another to obtain the two different speeds of the output shaft. In a second type of prior art device, a spring clutch is employed with speed-changing transmission gears which are manually shifted. A third type of prior art device uses solid state electronic circuits to vary the output-shaft speed in relation to the pressure applied to the trigger of the power tool.

SUMMARY OF THE PRESENT INVENTION

The two-speed tool (or other device) provided by the present invention requires no shifting of the chuck and no shifting of gears. Since the chuck is not moved, the balance of the tool is not disturbed. It uses fewer gears, is simple in design, and easy to use. The two output speeds are obtained merely by moving an electric switch to reverse the direction of rotation of a reversible constant speed drive motor.

DESCRIPTION OF THE PREFERRED EMBODIMENTS

Figure 1:
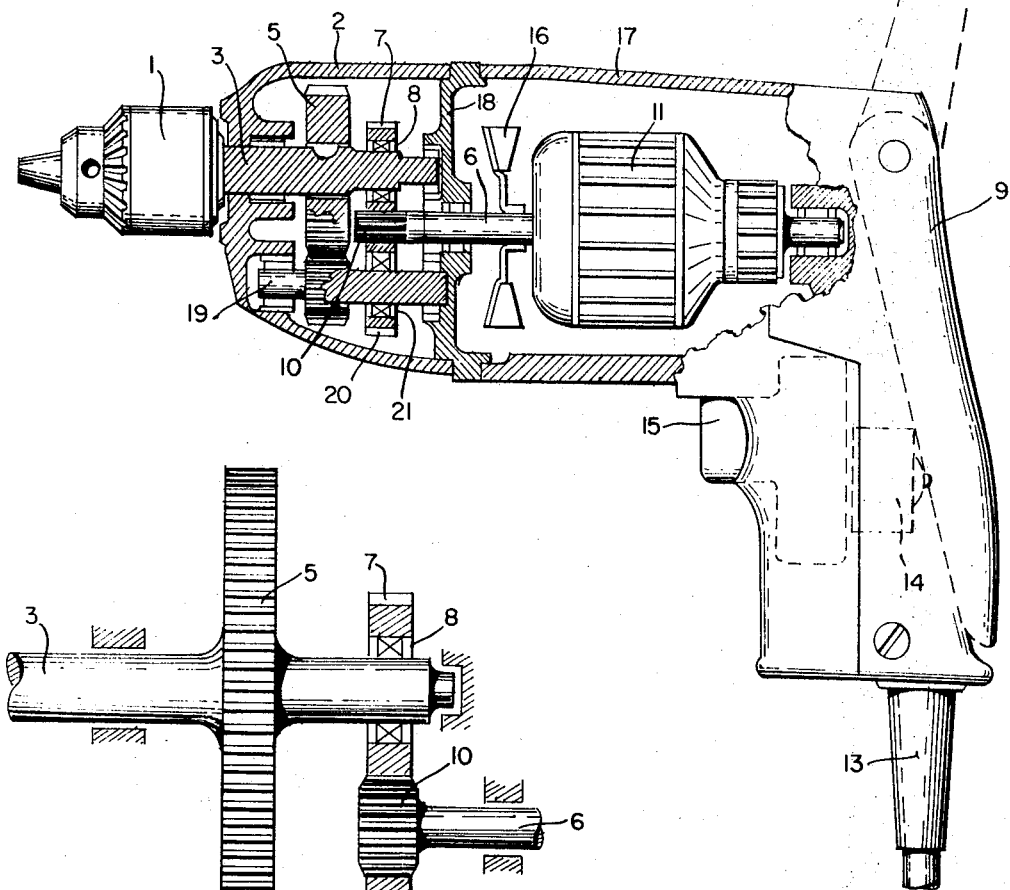
FIG. 1 is an elevational view, partly in section, illustrating the present invention applied to an electric hand drill.
Figure 2:
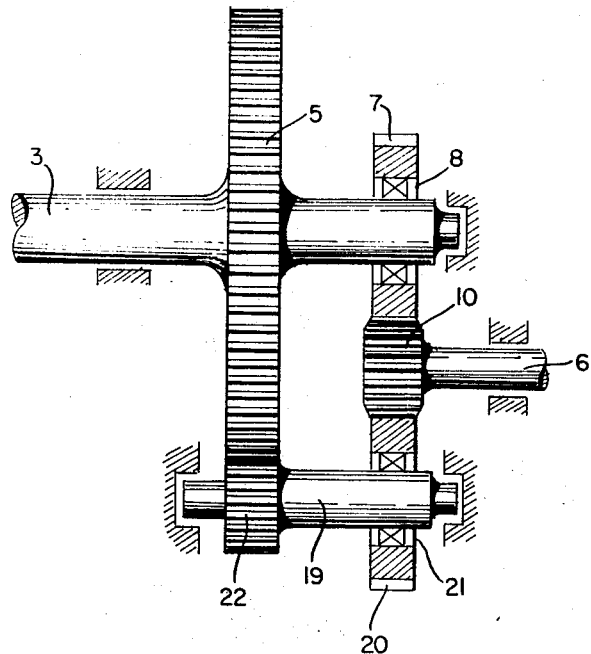
FIG. 2 is an enlarged view, in section, of the gear train of FIG. 1 (including the uni-directional clutches)

FIG. 1 illustrates the overall assembly of a two-speed electric hand drill, while FIG. 2 is an enlarged view, in section, of the gear train. The drill of FIG. 1 includes the usual type of chuck 1 secured to the forward end of output shaft 3. The drill is powered by a constant speed reversible A-C/D-C motor 11 housed in the aft housing 17, and suitably supported in bearings. The motor 11 drives a shaft 6 having secured thereto a fan 16 for cooling the tool. Shaft 6 is supported in bearings mounted in a center plate 18 disposed normal to the shaft and located between the aft housing 17 and a forward housing or gear casing 2. Mounted within gear casing 2 are the gear trains (each with unidirectional clutch coupling) which connect the drive shaft 6 to the driven output shaft 3. These gear trains and one-way clutches are effective, in accordance with the present invention, to drive output shaft 3 in the same direction at one of two speeds, according solely to the direction of rotation of the constant speed reversible D-C motor 11.

Secured to or integral with the forward end of drive shaft 6 is a pinion or gear 10 which meshes with and drives gears 7 and 20. The gears 7 and 20 are disposed in a common plane normal to the shaft 6, one gear 7 being located on one side of the pinion 10 and the other gear 20 being located on the other side. Gear 7 is mounted on and coupled to the shaft 3 by means of an interposed unidirectional clutch 8, while gear 20 is mounted on and coupled to a counter shaft 19 by means of an interposed uni-directional clutch 21.

The unidirectional clutches 8 and 21 may take any one of several known forms. A fragmentary showing of one suitable form is given in FIGS. 6 and 7. The type there shown is a roller type clutch manufactured by Torrington Company, Torrington, Conn.

Figure 6:
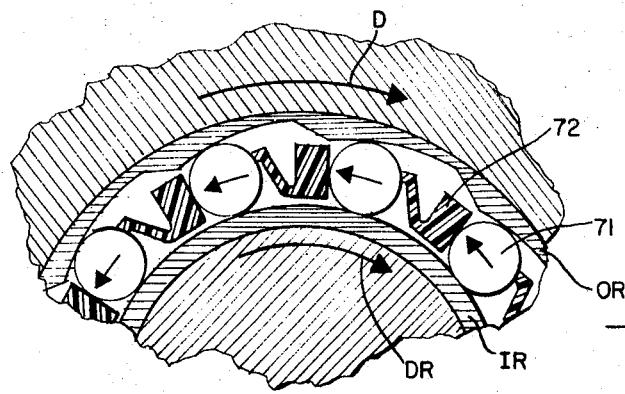
FIGS. 6 and 7 are fragmentary illustrations, in section, showing one known form of uni-directional clutch suitable for use in the present invention.
Figure 7:
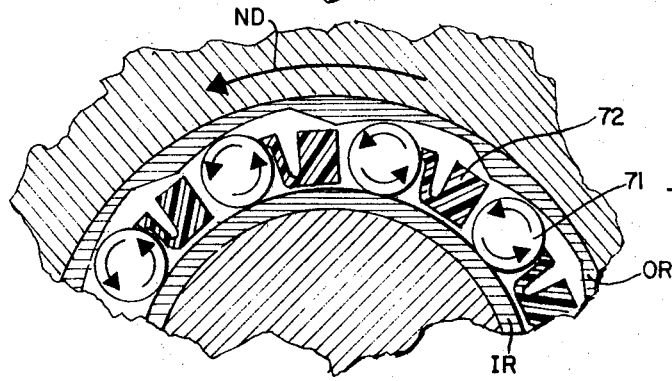

When one-way clutches of the type shown in FIGS. 6 and 7 are used in the particular form of drive illustrated in FIGS. 1 and 2, the two clutches 8 and 21 are installed in positions which are reversed relative to each other. In other words, if the fragmentary view in FIG. 6 is considered to be a view of clutch 8 looking from left to right in FIGS. 1 and 2, then the same FIG. 6 is a view of clutch 21 looking in the opposite direction, i.e., from right to left in FIGS. 1 and 2.

Coupled to, or integral with, the forward end of the output counter shaft 19 is a pinion 22 which is in mesh with a large gear 5 keyed or otherwise secured to output shaft 3.

The operation of the transmission system of FIG. 2 will now be described. It will be assumed that clutch 8 is installed on shaft 3 in such position that FIG. 6 is a fragmentary view of clutch 8 as seen looking from left to right in FIG. 2. Clutch 21, although similar in construction to clutch 8, is installed on counter shaft 19 in a position which is the reverse of clutch 8. Thus, FIG. 6 is a fragmentary view of clutch 21 as seen looking from right to left in FIG. 2.

With clutches 8 and 21 arranged on shafts 3 and 19 as described above, when the drive shaft 6 is rotated in a counterclockwise direction, as viewed looking from left to right in FIG. 2, the output shaft 3 is driven at the higher of its two rates of speed through pinion 10, gear 7, and clutch 8. When drive shaft 6 is reversed in direction of rotation to drive pinion 10 clockwise, as viewed looking from left to right in FIG. 2, output shaft 3 is driven at its lower rate of speed through gear 20, clutch 21, counter shaft 19, pinion 22 and large gear 5.

To describe in somewhat greater detail the two-speed drive discussed above, consider first gear 7 and clutch 8.

When the drive shaft 6 is driven in a counterclockwise direction, as viewed left to right in FIG. 2, the gear 7 and the outer race of clutch 8 (which is keyed to, or has an interference fit, with gear 7) rotate in a clockwise direction. An examination of FIG. 6 will reveal that when the outer race OR of clutch 8 is driven clockwise, indicated by the arrow D in FIG. 6, the rollers 71 become locked against the ramps of the outer race and as a result the inner race IR of clutch 8 (which is keyed to or has an interference fit with shaft 3) is driven in the same clockwise direction, indicated by the arrow DR. Thus, output shaft 3 is driven clockwise, as viewed from left to right in FIG. 2.

Consider now gear 20 and clutch 21 when the drive shaft 6 is being driven in the direction assumed above, i.e., in the counterclockwise direction, viewed left to right in FIG. 2. It will be recalled that FIG. 6 is a fragmentary view of clutch 21 as viewed in FIG. 2 looking from right to left. So viewed, shaft 6 is rotating clockwise. When shaft 6 is driven in the clockwise direction, viewed right to left in FIG. 2, the gear 20 and the outer race OR of clutch 21 are being driven in a counterclockwise direction, as indicated by the arrow ND in FIG. 7. It will be seen that when the outer race OR in FIG. 7 is driven counterclockwise, the rollers 71 move against and compress the plastic spring members 72, and the clutch is free-running. The inner race IR is not driven and, accordingly, the counter shaft 19 is not driven.

Consider now the fact that when shaft 6 is driven counterclockwise as viewed from left to right in FIG. 2, clutch 8 locks gear 7 to shaft 3, thereby causing clockwise rotation of shaft 3 and gear 5, as viewed left to right in FIG. 2. Pinion 22 and counter shaft 19 are thus rotated counterclockwise, at relatively high speed. This direction of rotation of counter shaft 19 is illustrated in FIG. 7 which may be deemed to be a view of clutch 21 as seen looking from right to left in FIG. 2. Thus, the clutch 21 is free running.

Consider also the effect of the rotation of output shaft 3 on clutch 8 when the output shaft 3 is being driven through gear 20, clutch 21, counter shaft 19, pinion 22 and gear 5, the direction of rotation of shaft 3 being clockwise, as viewed left to right in FIG. 2. In this condition, as previously described, gear 7 is being driven counterclockwise. As seen from FIG. 7, clutch 8 is free running.

Figure 3:
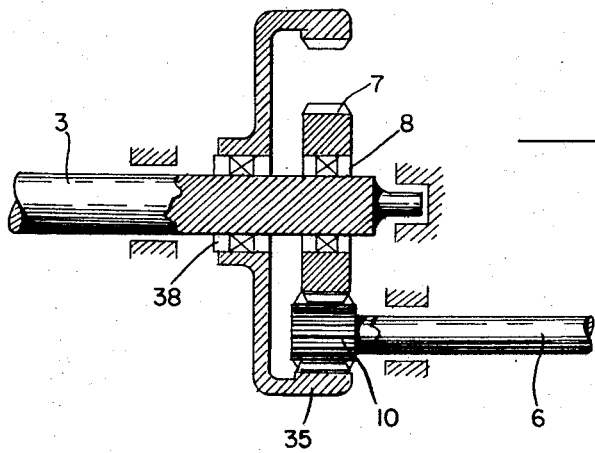
FIGS. 3 and 4 are views, in section, of two further forms of gear train embodying the present invention.

FIG. 3 illustrates a modified design in which an internal ring gear 35 is used. Those parts in FIG. 3 which are similar to parts in FIG. 2 are identified by the same reference numerals. Drive shaft 6, pinion 10, gear 7 clutch 8 and output shaft 3 may be considered to be similar to the same parts of FIG. 2. Rotation of drive shaft 6 in a counterclockwise direction as viewed from left to right in FIG. 3, drives gear 7 in the clockwise direction, and as indicated by FIG. 6, clutch 8 is locked to and drives output shaft 3 in the clockwise direction.

In FIG. 3, the second clutch, identified as clutch 38, is not reversed relative to clutch 8, but is mounted on shaft 3 in the same relative position as clutch 8. Thus, FIGS. 6 and 7 may be deemed to be views of clutch 21, as well as of clutch 8, both viewed looking from left to right in FIG. 3. When drive shaft 6 is driven by the reversible drive motor in the counterclockwise direction, viewed from left to right in FIG. 3, pinion 10 drives gear 35 in the same counterclockwise direction, and as seen in FIG. 7, under this condition, clutch 38 is free running on shaft 3.

When in FIG. 3, drive shaft 6 is driven clockwise as viewed from left to right in FIG. 3, clutch 8 is driven counterclockwise and is thus free-running on shaft 3. Pinion 10 now drives gear 35 clockwise as viewed from left to right in FIG. 3. This is the locked direction for clutch 38 and accordingly shaft 3 is driven by gear 35 but at a substantially reduced rate of speed as compared with its speed when driven by gear 7 and clutch 8.

Figure 4:
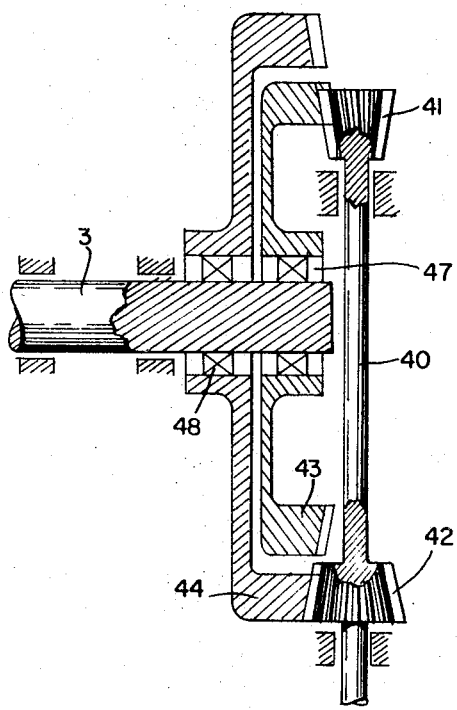

FIG. 4 illustrates the invention as applied to an arrangement employing spiroid or hypoid type gears. A pair of ring gears 43 and 44 are mounted on and coupled to output shaft 3 through uni-directional clutches 47 and 48, respectively. Both clutches are similarly mounted. One is not reversed relative to the others. Thus, the fragmentary views in FIGS. 6 and 7 may be deemed to be views of the structure of both of the clutches 47 and 48, as viewed looking from left to right in FIG. 4.

Consider now the condition, in FIG. 4 when the drive shaft 40 is rotated in a clockwise direction, as viewed looking from bottom to top in FIG. 4. Hypoid gear 41 drives the smaller ring gear 43 in a clockwise direction as viewed looking from left to right in FIG. 4. At the same time hypoid gear 42 drives ring gear 44 in a counterclockwise direction as viewed looking left to right in FIG. 4. Since both clutches are similarly mounted on the output shaft 3, one clutch will be locked to shaft 3 and the other will be free running. It will be seen from FIGS. 6 and 7 that under the conditions assumed above, clutch 47 will be locked to output shaft 3 while clutch 48 will be free running.

When, in FIG. 4, the drive shaft 40 is driven in the opposite direction, i.e., counterclockwise as viewed looking bottom to top in FIG. 4, the ring gears 43 and 44 will be driven in the opposite directions from that mentioned above, and clutch 48 will now be locked to output shaft 3 while clutch 47 will be free running. It will be noted that the direction of rotation of the output shaft 3 is the same under both conditions of rotation of input shaft 40; only the speed of output shaft 3 is changed when the direction of rotation of input shaft 40 is changed.

Figure 5:
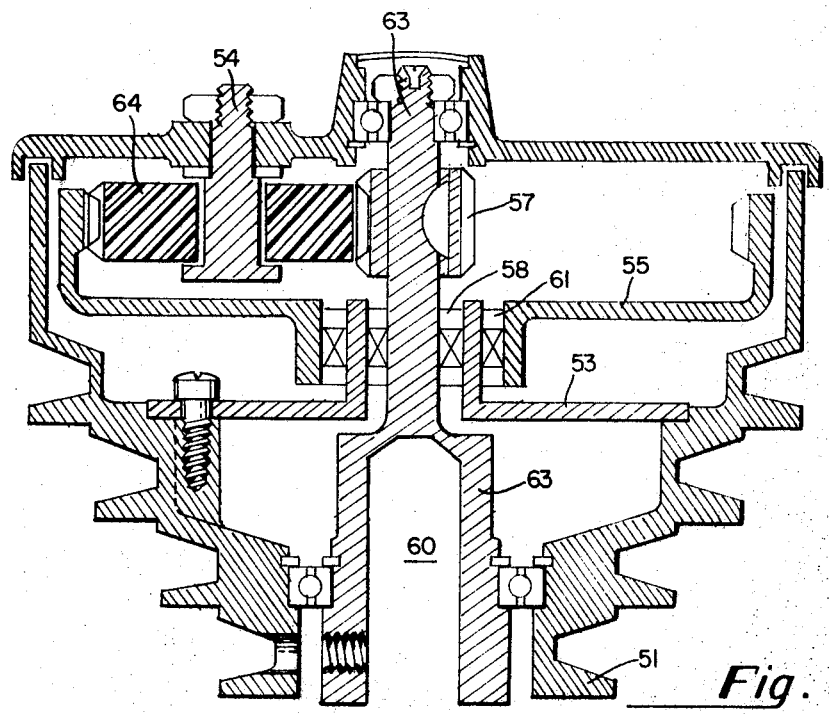
FIG. 5 is a view, in section, showing the present invention applied to a pulley type of output drive.

In FIG. 5, the invention is shown applied to a two-speed pulley useful, for example, in driving a drill press or lathe. The input shaft 63 has an enlarged diameter at one end and a bore 60 for receiving the motor driven drive shaft (not shown). Shaft 63 drives the output pulley 51 through an output plate 53. Output plate 53 is connected to the shaft 63 either through a high speed one-way clutch 58 or through a low speed one-way clutch 61. Clutch 58 allows the pulley 51 to be driven at the same speed as the shaft 63, whereas clutch 61 allows the pulley 51 to be driven at a reduced speed. The drive path in the latter case includes, pinion 57, idler gear 64 on stud 54, ring gear 55 and clutch 61.

In FIG. 5, clutches 58 and 61 are mounted in reversed relative positions. Consider FIGS. 6 and 7 to be fragmentary views of clutch 58 looking from bottom to top in FIG. 5. Then, these same FIGS. 6 and 7 are fragmentary views of clutch 61, as viewed looking from top to bottom in FIG. 5.

Assume that the motor shaft (not shown) drives input shaft 63 in a counterclockwise direction, as viewed looking bottom to top in FIG. 5. It will be seen from FIG. 6 that when the shaft and inner race IR are driven counterclockwise, the clutch locks and drives the outer race OR, which in the case of FIG. 5 is connected to the drive plate 53. Thus, pulley 51 is driven counterclockwise, as viewed looking bottom to top in FIG. 5. At the same time ring gear 55 is being driven clockwise at a reduced rate of speed, but since clutch 61 is reversed relative to clutch 58, clutch 61 is free running.

Consider now the condition, in FIG. 5, when the shaft 63 is driven in the clockwise direction, as viewed looking bottom to top in FIG. 5. Clutch 58 is now free running on shaft 63. Pinion 57 is driving the idler 64 counterclockwise, as viewed looking bottom to top in FIG. 5, and ring gear 55 is also being driven counterclockwise. With clutch 61 reversed from clutch 58, rotation of ring gear 55 in the counterclockwise direction locks clutch 61 to drive plate 53 and, accordingly, the drive plate 53 is driven in a counterclockwise direction, but at a reduced rate of speed relative to its speed when driven by clutch 58.

In the structures shown in FIGS. 1–5 and discussed thus far, when the direction of rotation of the drive shaft (6, or 40, or 63) is changed, the speed of the output shaft (3 or 51) is changed but its direction of rotation remains the same. In certain cases, it may be desirable to be able to change the direction of rotation of the output shaft, as well as to change its speed. Accordingly, structures have been shown in FIGS. 8 and 9 which adapt the two-speed drive of the present invention to either of two directions of rotation of the output shaft.

Figure 8:
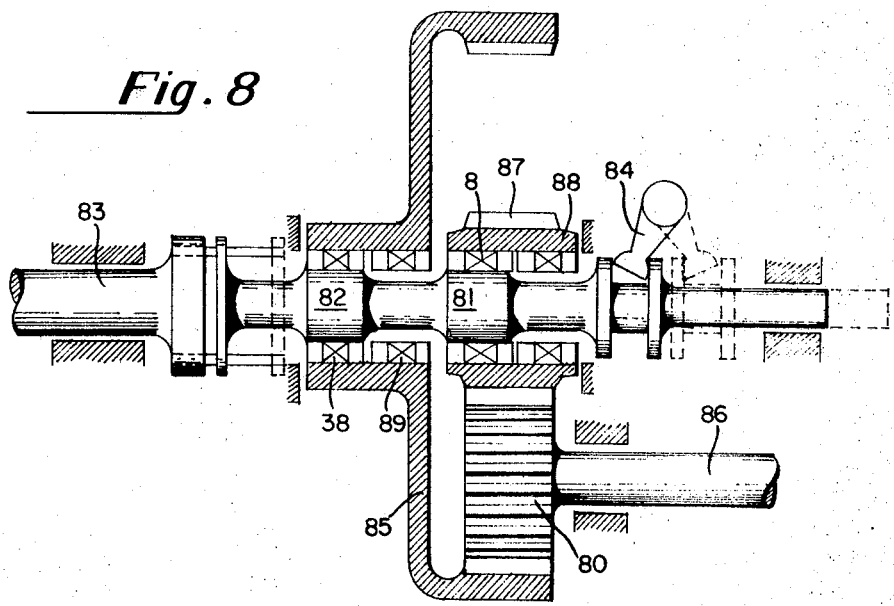
FIGS. 8 and 9 are views, in section, illustrating forms of drive of the present invention modified to allow for two-speed drive of the output shaft in either of two directions.

Referring first to FIG. 8, it will be seen that output shaft 83 is provided with lands 81 and 82 and with undercuts adjacent thereto. Shaft 83 is driven by input drive shaft 86 at one or the other of two speeds, and in one or the other of two directions of rotation, according solely to the direction of rotation of input drive shaft 86 and to the axial position of output shaft 83 as controlled by shift lever 84. When the output shaft 83 is in the position illustrated in FIG. 8, with shift lever 84 in the solid-line position, the two-speed drive is substantially identical to that illustrated in FIG. 3 and described hereinbefore. In brief, when input drive shaft 86 is driven counterclockwise, as viewed left to right in FIG. 8, the output shaft 83 is driven clockwise through pinion 80, gear 87, clutch 8, and land 81 on shaft 83. When the input shaft 86 is driven in the opposite direction of rotation, output shaft 83 is driven clockwise, at a reduced speed, through pinion 80, ring gear 85, clutch 38, and land 82 on shaft 83.

To drive the output shaft 83 in the opposite direction of rotation (counterclockwise as viewed left to right in FIG. 8) shift lever 84 is shifted to the dotted-line position to shift the land areas 81 and 82 of shaft 83 into alignment with clutches 88 and 89, respectively, and out of alignment with clutches 8 and 38. Clutches 88 and 89 are similar to clutches 8 and 38 but are reversed in position relative thereto. Thus, when input shaft 86 is driven in the clockwise direction, as viewed looking from left to right in FIG. 8, output shaft 83 is driven in a counter-clockwise direction through pinion 80, gear 87, clutch 88, and land 81 on shaft 83. When the direction of rotation of input shaft 86 is changed to counterclockwise, as viewed looking from left to right in FIG. 8, output shaft 83 is driven counterclockwise through pinion 80, ring gear 85, clutch 89 and the land portion 82 of the shaft 83.

It will be seen then that in FIG. 8, if the direction of rotation of the input shaft 86 is counterclockwise (viewed from left to right) and if this direction of shaft 86 is not changed, and if the output shaft 83 is shifted by shift lever 84 from the solid-line to the dash-line position, the output shaft 83 is changed from a high speed in the clockwise direction to a low speed in the opposite direction.

Figure 9:
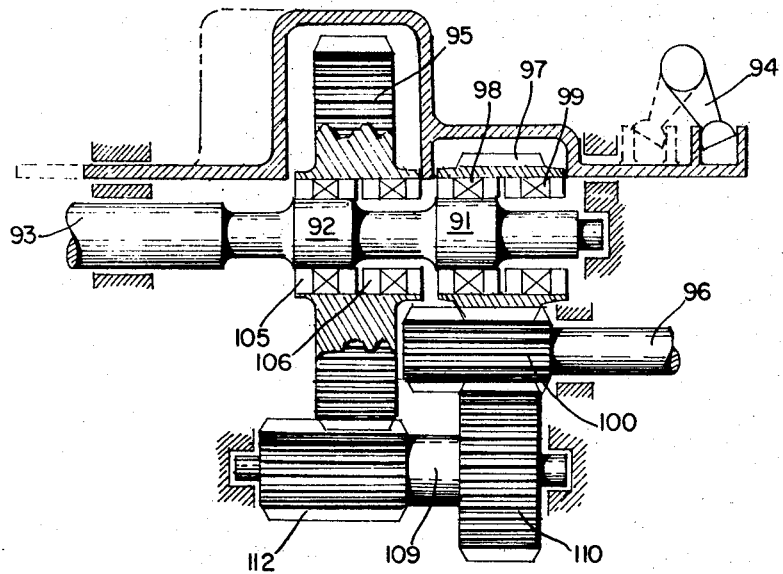

FIG. 9 illustrates another structural arrangement for achieving two-speed two-direction control of the output shaft 93. In FIG. 9, the output shaft 93 is axially fixed, but pairs of clutches 98, 99 and 105, 106, are shifted therealong under the manual control of shift lever 94, to place one or the other clutch of the pair at the land positions on the shaft 93.

In FIG. 9, with shift lever 94 in the solid-line position shown in the drawing the clutches 98 and 105 are in alignment with the land portions 91 and 92 of the output shaft 93, and the other clutches 99 and 106 are aligned with the undercut portions of shaft 93. Under these conditions, when the input driving shaft 96 is driven counterclockwise, as viewed from left to right in FIG. 9, pinion 100 drives gear 97 clockwise and clutch 98 locks to land 91 and drives shaft 93 clockwise. At this same time, pinion 100 is also driving gear 100, counter shaft 109, and pinion 112 clockwise, and pinion 112 is therefore driving gear 95 counterclockwise. With gear 95 rotating counterclockwise, clutch 105 is free-running on land 92 of output shaft 93.

When the rotation of the input drive shaft 96 is reversed from counterlockwise to clockwise, the directions of rotation of gears 97 and 95 are reversed and, accordingly, clutch 98 becomes free-running and clutch 105 locks to land 92 and drives output shaft 93 in the same direction as before but at a substantially reduced rate of speed.

To effect a change in the direction of rotation of the output shaft 93, shift lever 94 is moved from the solid-line position to the dotted-line position shown in FIG. 9. This moves the clutches 98 and 105 out of alignment with the land portions 91 and 92 of shaft 93 and brings the clutches 99 and 106 into alignment therewith. Clutch 99 is reversed relative to clutch 98, and clutch 106 is reversed relative to clutch 105. Accordingly, when the shift lever 94 is in the dotted position, and clutches 99 and 106 are in alignment with the land portions 91 and 92, if input drive shaft 96 be driven counterclockwise, as viewed left to right in FIG. 9, the output shaft 93 is driven counterclockwise at the slow speed through gear 110, counter shaft 109, pinion 112, gear 95 and clutch 106. If the direction of rotation of the input shaft 96 be changed from counterclockwise to clockwise, then output shaft 93 will be driven counterclockwise at high speed through gear 97 and clutch 99.

I have shown and described a number of arrangements utilizing the basic two-speed drive of the present invention. A number of modifications could be made, all based upon and stemming from the basic concept. For example, in FIG. 2, gear 20 could be keyed or otherwise fixed to counter shaft 19 and uni-directional clutch 21 could be interposed between gear 5 and output shaft 3.

It should also be mentioned that the input drive shaft need not be parallel to, nor perpendicular to, the output drive shaft 3. It is apparent that the input and output drive shafts could have an angular relation other than either zero or 90°.

While the basic concept of the two-speed drive of the present invention has been clearly described, it may be helpful to complete the description of the hand drill illustrated in FIG. 1. Power is supplied to the tool through the power supply cable 13. The main ON-OFF switch is the finger trigger switch 15. The motor reversing switch is the push-button switch 14. If desired, a mechanical interlock may be provided to prevent switching from high speed to low speed, or vice versa, when the main trigger switch 15 is depressed. For slow-speed use, the auxiliary handle 9 is flipped out to the dotted-line position. This provides a better grip on the hand drill for low speed operation. When the auxiliary handle 9 is pivoted from the dotted line position back to the solid-line position shown in FIG. 1, the handle 9 presses against the reversing switch 14 and hold switch 14 depressed. When depressed, the unit is in high speed operation.

While the preferred embodiments of this invention have been described in some detail, it will be obvious to one skilled in the art that various modifications may be made without departing from the invention.

What is claimed is:

1. A reversible two-speed drive including:
    (a) reversible drive means including a rotatable input shaft;
    (b) output means, including a rotatable output shaft;
    (c) power transmission means, including uni-directional clutch means in each of two different transmission paths, coupling said input shaft to said output shaft to drive said output shaft at either one of two different speeds, relative to said input shaft speed, according solely to the direction of rotation of said input shaft; and
    (d) shift means for shifting the axial position of one of said shafts relative to said uni-directional clutch means for reversing the direction of rotation of the output shaft.

2. Apparatus as claimed in claim 1 characterized in that:
(a) separate gear means are provided in each of said transmission paths;
(b) each of said uni-directional clutches includes an inner race fixed to the output shaft and an outer race fixed to one of said gear means;
(c) only one of said clutches at a time coupling said input shaft to said output shaft according to the direction of rotation of said input shaft and the position of the shaft means.

3. Apparatus according to claim 2, characterized in that said shift means is operative to shift said one shaft axially.

4. Apparatus according to claim 3, characterized in that said one shaft is the output shaft.

5. Apparatus according to claim 2, characterized in that said shift means is operative to shift the clutch means axially along said one shaft.

6. Apparatus according to claim 5, characterized in that said one shaft is the output shaft.

7. Apparatus according to claim 1, characterized in that said shift means is operative to shift said one shaft axially.

8. Apparatus according to claim 7, characterized in that said one shaft is the output shaft.

9. Apparatus according to claim 1, characterized in that said shift means is operative to shift the clutch means axially along said one shaft.

10. Apparatus according to claim 9, characterized in that said one shaft is the output shaft.

References Cited

UNITED STATES PATENTS

| | | | |
|---|---|---|---|
| 2,038,082 | 4/1936 | Lazich | 74—812 |
| 2,687,658 | 8/1954 | Nelson et al. | 74—812 |
| 2,810,305 | 10/1957 | Brinza et al. | 74—812 |
| 3,209,621 | 10/1965 | Laurent | 74—812 |
| 3,319,494 | 5/1967 | Ulbing | 74—812 |
| 3,361,010 | 1/1968 | Miller | 74—810 |

LEONARD H. GERIN, Primary Examiner

U.S. Cl. X.R.

192—45